Figure 1:
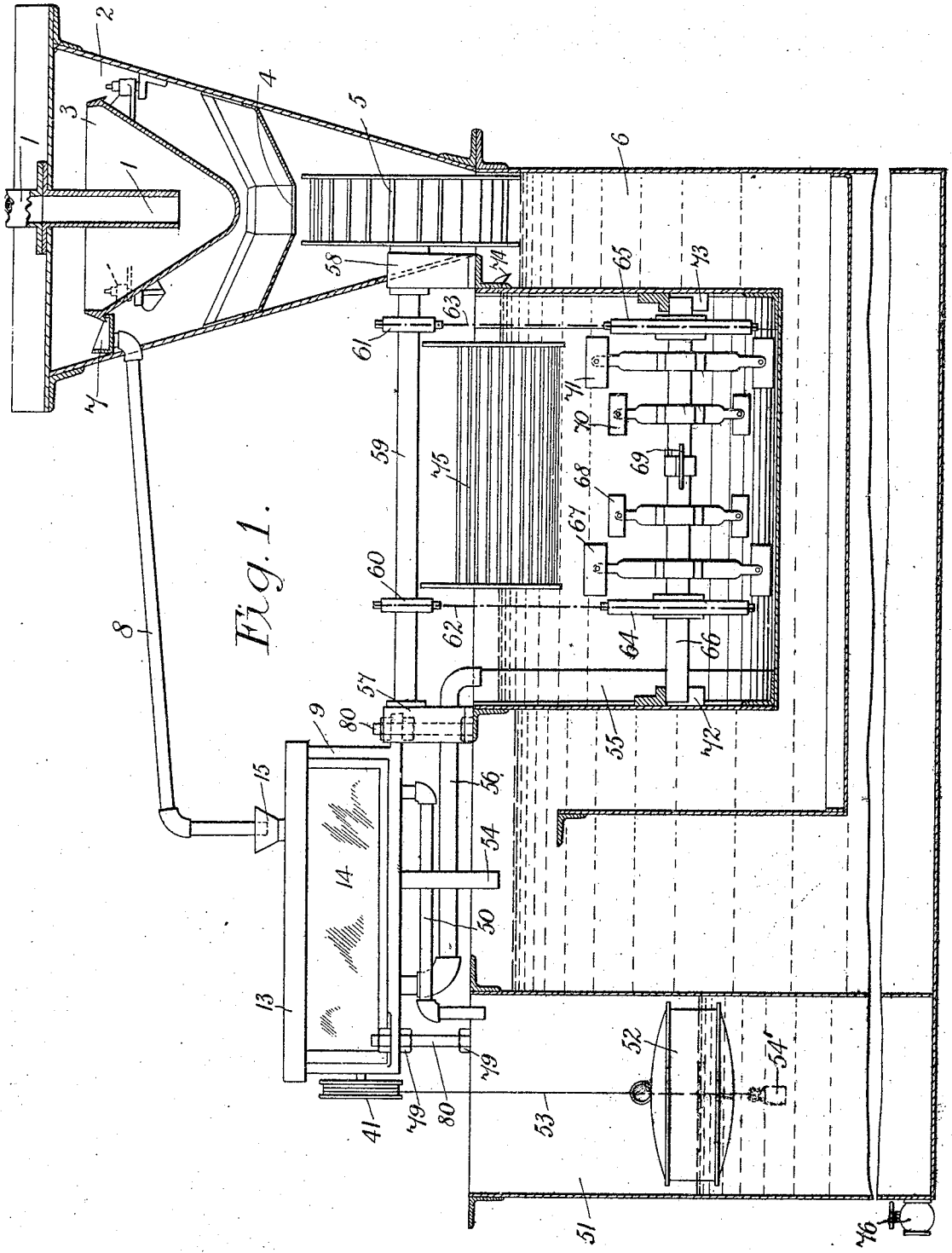

B. C. HINMAN & E. W. ROBEY.
APPARATUS FOR ADDING PREDETERMINED QUANTITIES OF SUBSTANCES TO A UNIFORM OR VARIABLE FLOW OF LIQUID.
APPLICATION FILED SEPT. 26, 1914.

1,179,311.

Patented Apr. 11, 1916.

3 SHEETS—SHEET 1.

Witnesses
Harry P. Jennings
C. C. Canny

Inventors
Bertrand C. Hinman & Ernest W. Robey,
By Foster, Freeman, Watson & Coit,
Attorneys.

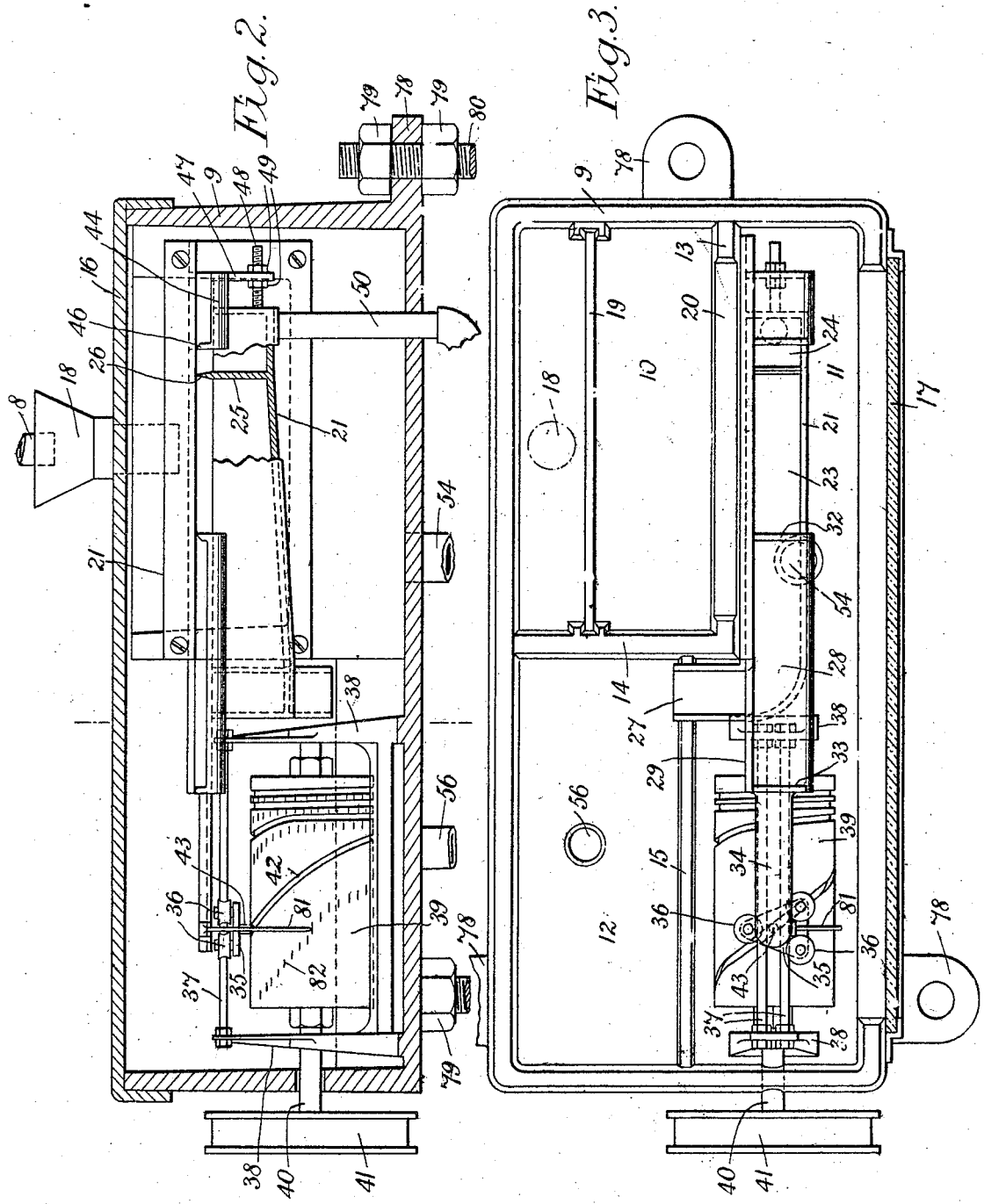

UNITED STATES PATENT OFFICE.

BERTRAND CHASE HINMAN, OF LONDON, AND ERNEST WILLIAM ROBEY, OF SOUTH WOODFORD, ENGLAND.

APPARATUS FOR ADDING PREDETERMINED QUANTITIES OF SUBSTANCES TO A UNIFORM OR VARIABLE FLOW OF LIQUID.

1,179,311. Specification of Letters Patent. Patented Apr. 11, 1916.

Application filed September 26, 1914. Serial No. 863,748.

*To all whom it may concern:*

Be it known that we, BERTRAND CHASE HINMAN, a citizen of the United States of America, and a resident of London, England, and ERNEST WILLIAM ROBEY, a subject of His Majesty the King of Great Britain, and a resident of South Woodford, Essex, England, have invented a certain new and useful Improvement in Apparatus for Adding Predetermined Quantities of Substances to a Uniform or Variable Flow of Liquid, of which the following is a specification.

This invention relates more particularly to an apparatus for the addition of reagents, precipitating or flocculating substances or the like, to a uniform or variable flow of liquid, in water softening or purifying processes, but is also applicable to many industrial operations where predetermined quantities of substances are required to be added to a flow of liquid.

According to the present invention the substance or substances to be added to the uniform or variable flow of liquid to be treated, are dissolved or suspended, or partly dissolved and partly suspended in a liquid contained in a vessel preferably having means for so agitating its contents as to maintain a practically homogeneous mixture, and gradually displacing such mixture by progressively diluting it with an increasing proportion of the liquid which is to be treated and causing the discharge from such vessel to commingle with the main body of the flow of such liquid. It is not contemplated by such process to displace the whole of the substance or substances contained in the vessel in which the dilution is to take place, as obviously, to do so, would, at the end of the operation require an infinite volume of the displacing liquid. For all practical purposes it will be found sufficient if the dilution is carried to the displacement of approximately 90% of the previously mentioned substance or substances, the amount of such to be charged in the displacing vessel at the beginning of the operation must therefore be approximately 11.1% more than is required to be delivered. When the above mentioned 90% of the substance or substances have been displaced, the operation may be continued by adding a second charge of such to the displacing vessel, but this time, and in successive times, the amount will be only that required to be delivered. When the volume of liquid to be treated is large in proportion to the amount of reagent with which it is to be treated or where the amount of reagent required to treat a unit quantity of water has to be varied, the main flow is first proportionately divided, and the divided part led to the weir. The commingled streams of hard water or liquid and reagent so produced will usually pass into precipitating, settling and filtering tanks in accordance with the usual practice.

In order that the invention may be more readily understood reference is made to the accompanying drawings which illustrate a water softening plant.

Figure 4:
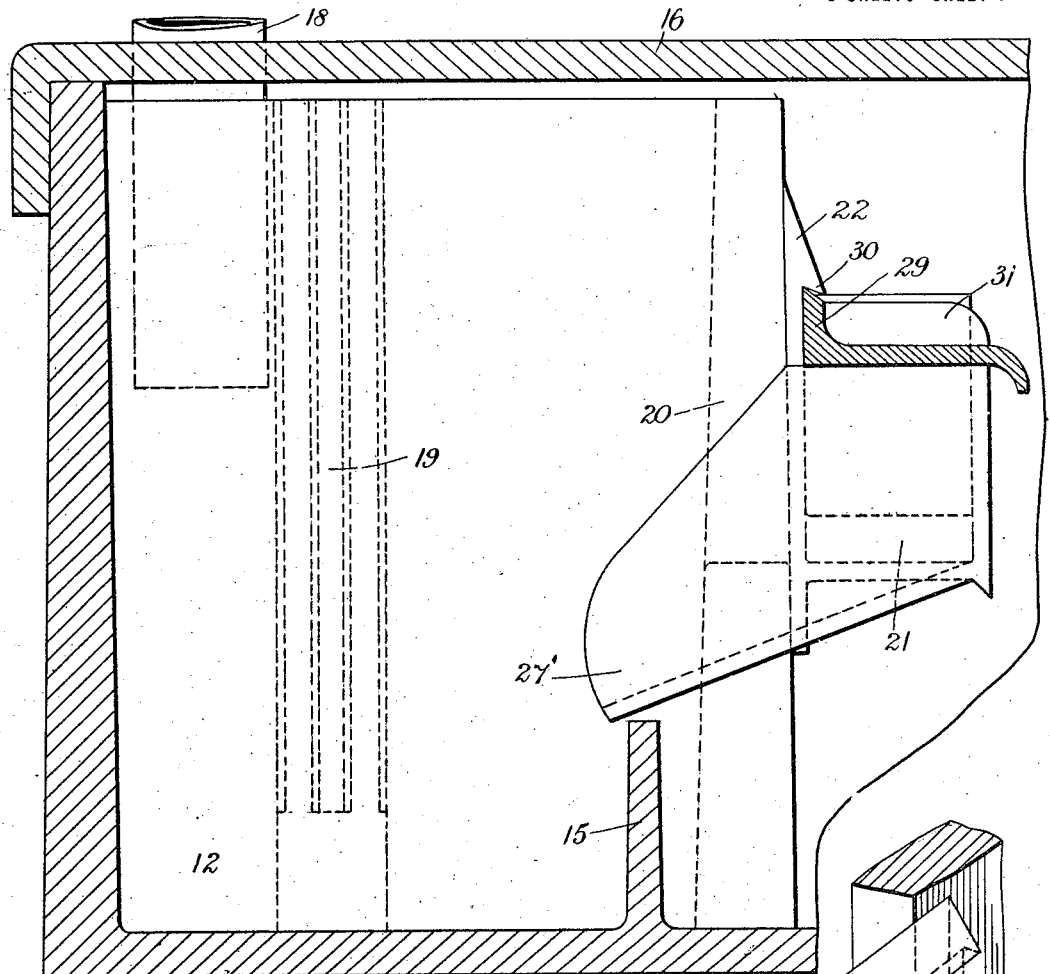
Figure 5:
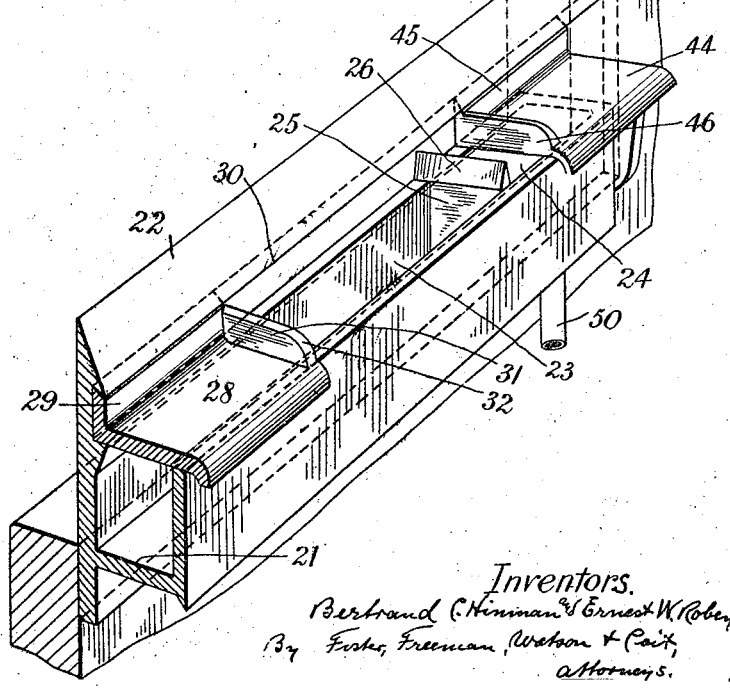

In the drawings: Figure 1 is a diagrammatic view of a water softening plant partly in section, Fig. 2 is a sectional elevation of a proportioning box drawn on an enlarged scale, Fig. 3 is a plan of same, the cover being removed, Fig. 4 is a section of part of the proportioning box and Fig. 5 is a perspective view of part of the said box.

Referring to the drawings, the hard water to be treated is supplied through a pipe 1 that extends through the cover of a tank 2 into a conical receptacle 3 located in said tank. The receptacle 3 is adjustably supported within the tank 2 and virtually constitutes a weir, the water flowing over the upper edge thereof in an even stream into the tank 2. The main stream of water flows from tank 2 through an opening 4 in the bottom thereof onto a water wheel 5 and falls therefrom into a tank 6. The predetermined proportion of the water flowing over the weir 3 is intercepted by a catchment cup 7 and conducted therefrom by means of the pipe 8 to a proportioning box 9. This box is divided into three chambers 10, 11, 12 by parting walls 13, 14, 15, and it has a cover 16 and a glass window or wall 17. A funnel shaped inlet pipe 18 projects through the cover 16 and extends into the chamber 10 on one side of a baffle wall or partition 19 that extends to within a short distance of the bottom of said chamber. The wall 13 is cut away at 20 and a trough 21 is secured to this wall so as to cover part of the opening therein. The upper edge 22 of the trough 21 is beveled and forms a horizontal weir over which the water from chamber 10 flows in an even stream. The baffle 19 insures that the water is undisturbed as it flows to the said edge 22. The trough 21 is divided into two chambers 23, 24, by a wall 25 having an upper knife edge 26. The chamber 23 extends over the wall 15 into the chamber 12 and terminates in a chute 27 for discharging into the said chamber 12.

Slidably mounted on the trough 21 and over the chamber 23 is a tray or cover 28 the rear wall 29 of which lies beneath the lower edge 30 of the weir 22. This tray has a side wall 31 provided with a knife edge 32 for cutting the liquid and a second side wall 33 and is adapted to intercept water flowing over weir 22 and discharge such water into the chamber 11. The tray 28 has an extension 34 that is secured to a sliding carriage 35. This carriage has anti-friction rollers 36 that run on a pair of guide rods 37 that are supported in upright brackets or supports 38. Beneath the rods 37 is a drum or cylinder 39 fast on a shaft 40 that is mounted in bearings in the supports 38. The shaft 40 extends through the wall of the box 9 and carries on the outside of the box a pulley wheel 41. The drum 39 has a peripheral groove or thread 42 of progressively increasing pitch and a pin or tooth 43 projects down from the carriage 35 and engages said groove. It will be seen therefore that on the drum being turned at a constant rate of speed in an anti-clockwise direction when viewed from the right hand the tray 28 will be slid along to uncover the chamber 23 at a progressively increasing rate of speed, the uncovering action being continued during the working of the apparatus while the amount of movement which has been imparted to the cover may be indicated in any usual manner as by an index suitably placed.

The chamber 24 of the trough 21 is partly covered by an adjustable tray or cover 44 having a rear wall 45 located beneath the edge 30 of the weir 22 and a side knife edged wall 46. The tray 44 has a depending piece 47 that is adjustable on a screw 48 by means of nuts 49, and is so adjusted that a predetermined proportion of the flow over the weir 22 is admitted to the chamber 24. The liquid caught in chamber 24 is conducted by a pipe 50 to a float tank 51. Within the tank 51 is a float 52 to which is attached one end of a wire rope 53. This rope is wound around the pulley 41 four or five times and the other end carries a counter-weight 54. As the water in the tank 51 rises the weight 54′ draws the wire rope over the pulley 41 and turns the drum 39 in an anti-clockwise direction when viewed from the right hand, thus progressively uncovering the chamber 23. The liquid intercepted by the trays 28, 44, falls into the chamber 11 and is conveyed therefrom to the tank 6 by a pipe 54, while the water admitted to the chamber 23 is discharged into chamber 12 and conveyed therefrom to a chemical tank 55 by a pipe 56.

Mounted in bearings 57, 58, above the tank 55 is a shaft 59 which carries the water wheel 5 and is turned by the latter. On the shaft 59 are two sprocket wheels 60, 61, from which depend two endless chains 62, 63, respectively. These chains support sprocket wheels 64, 65, on a shaft 66 which carries a number of paddles or stirrers 67, 68, 69, 70, 71. The shaft 66 is held from lateral displacement by two inverted U brackets 72, 73, attached to the walls of the tank 55. The main flow of liquid from tank 2 into tank 6 rotates the water wheel 5 and drives the stirrers in the chemical tank 55 thus keeping the contents of said tank in constant agitation. To increase the effect of the stirrers the bottom of the tank 55 is made semi-cylindrical. The object of the agitation is twofold, first to insure a homogeneous mixture in the event of the substance to be added to the liquid being wholly or partly in a state of suspension, and secondly to insure a prompt admixture of the diluting liquid with the contents of the chemical tank. A discharge opening 74 is provided in the tank 55 and a cage 75 is supported at the top of the tank for the purpose of receiving the reagents employed in the solution at the beginning of each operation.

The pitch of the thread 42 on the drum 39 can be obtained from the following series of figures: Assuming that the amount of chemical mixture in tank 55 is 100 gallons, and at the beginning of the cycle of operations this contains 100 lbs. of chemicals, and that it is desired to treat each unit of raw water, say 1000 gallons, with one pound of chemicals, then at the beginning of the cycle, the overflow from the chemical tank, hence, the amount of water flowing into it, must be at the rate of one gallon per unit of water to be treated. At the beginning of the treatment of the second unit of raw water there will remain only 99 lbs. of chemical in the 100 gallons of the mixture in tank 55 and hence the overflow must therefore be at the rate of 100/99ths gallons per unit of water treated. At the beginning of the treatment of the third unit, there will be 98 lbs. of chemicals in 100 gallons, and the overflow must therefore be at the rate of 100/98ths gallons per unit of water treated. At the beginning of the fourth unit it will be 100/97ths, and so on. At the beginning of the 51st unit, it will be 100/50th or two. If this series is plotted as ordinates and the units of water treated as abscissæ, the curve will be obtained, from which the pitch of the thread and the consequent length of opening between the two edges 26 and 32 can be obtained for any set of conditions, by anyone skilled in the art.

The operation of the apparatus is as follows:—The main flow of water to be treated flows from pipe 1 over weir 3 into the tank 6. The predetermined proportion of this stream is intercepted by the cup 7 and conducted to the box 9 where it is caused to flow over the horizontal weir 22. A fixed proportion of this flow is admitted to the chamber 24 and conducted to the float tank 51. The rise of the water in tank 51 actuates the drum 39 and causes the tray 28 to be slid at a progressively increasing rate of speed over the chamber 23 thus admitting a progressively increasing proportion of the flow to the chemical tank 55. This tank contains a charge of the appropriate substances (for example lime and soda ash in such amount that 90% of it is sufficient for the treatment of a predetermined quantity of water or the neutralizing of a predetermined amount of substances in the water to be treated) dissolved or suspended in such a quantity of water as will raise the level of the liquid in tank 55 to the discharge outlet 74. The overflow from tank 55 will thus be of equal volume to that admitted and while being of a constantly increasing volume will, owing to the proportional subdivision of the flow over weir 22 into the chambers 23, 24, carry—whether the flow be uniform or variable—the appropriate quantity of the substance or substances desired to be added to the hard water to be softened and such overflow is caused to commingle with the main stream of hard water. For example if the water to be treated contains say 10 degrees of temporary hardness requiring 5.6 grains per gallon of calcium oxid then the proportion of water to be diverted from 3 to the box 9 will be just one half of what must be diverted if the water to be treated has 20 degrees of temporary hardness and requires twice the quantity of calcium oxid per gallon and this amount would then be fed to the water without alteration of the strength of the chemical being used in the tank and this effect cannot be obtained if the entire amount of water is fed to weir box 10. The commingled streams of hard water and reagent so produced pass into precipitating, settling and filtering tanks in accordance with the usual practice. It should be understood that an appropriate quantity of reagent is placed in the cage 75 at the beginning of each operation and the float tank 51 is emptied; a valve 76 being provided for this purpose. In order to obtain an even stream of water over the weir 22, the box 9 is provided with lugs 78 which are adjustably supported by nuts 79 on vertical screws 80.

The object of metering or indicating some definite proportion of the total flow is to render it possible to at once determine the amount of chemical that has been displaced and consequently the amount remaining in the chemical tank so that the solution or mixture may be brought up to the full strength when the parts are re-set into their first operative position.

Obviously various modifications may be made in the manner of carrying this invention into effect, the above description being given merely by way of example.

What we claim is:—

1. Apparatus for dividing a progressively increasing proportion from the main body of a variable volume of flowing liquid comprising in combination a horizontal weir, means adapted to cause liquid to flow over said weir, a catchment cup or trough located in a position to intercept liquid flowing over said weir, means for progressively increasing the intercepting area of said catchment cup, a vessel, means for conveying the liquid intercepted by said catchment cup to said vessel and means for conveying the overflow or discharge from said vessel to the main body of the liquid.

2. Apparatus for dividing a progressively increasing proportion from the main body of a volume of flowing liquid comprising in combination a horizontal weir, means adapted to cause liquid to flow over said weir, a catchment cup or trough located in a position to intercept liquid flowing over said weir, a cover or tray slidable over said trough, means for causing a relative sliding movement between the cover and trough, a vessel, means for conveying the liquid intercepted by said trough to said vessel and means for conveying the overflow from said vessel to the main body of the liquid.

3. Apparatus comprising in combination a horizontal weir, means adapted to cause liquid to flow over said weir, a catchment cup or trough located in a position to intercept liquid flowing over said weir, a cover or tray slidable over said trough, a drum or cylinder having a thread or groove on its periphery, said thread having a progressively increasing pitch, a part attached to said tray and engaging said thread, means for rotating said drum whereby the tray is slid to uncover the trough at a progressively increasing rate of speed, a vessel, means for conveying the liquid intercepted by said trough to said vessel and means for conveying the overflow from said vessel to the main body of the liquid.

4. Apparatus comprising in combination a horizontal weir, means adapted to cause liquid to flow over said weir, a trough located in a position to intercept liquid flowing over said weir said trough being divided into two chambers, a tray slidable over one of said chambers, a tray adjustable over the second chamber and adapted to admit a predetermined proportion of the flow into said second chamber, a float tank, means for conveying the liquid admitted to the second chamber to said float tank, a drum or cylinder having a thread or groove on its periphery said thread having a progressively increasing pitch, a part attached to said first mentioned tray and engaging said thread, a shaft on which said drum is mounted, a pulley on said shaft, a float in said float tank, a rope one end of which is attached to said float, a counterweight to which the other end of said rope is attached said rope being wound around the pulley, a vessel, means for conveying the liquid intercepted by the first mentioned chamber in said trough to said vessel and means for conveying the overflow from said vessel to the main body of the liquid.

5. Apparatus comprising in combination means for intercepting a part of a flowing liquid, a vessel, means for conveying said part to said vessel, a second vessel, means in said first vessel for dividing a progressively increasing proportion of said part and conveying said increasing proportion to said second vessel and means for conducting the overflow or discharge from said second vessel to the main stream of liquid.

6. Apparatus comprising in combination means for intercepting a part of a flowing liquid, a vessel, means for conveying said part to said vessel, a second vessel, means in said first vessel for dividing a progressively increasing proportion of said part and conveying said increasing proportion to said second vessel, means in said second vessel adapted to agitate the contents thereof, a water wheel located in the path of the main stream of liquid and adapted to drive said agitating means, and means for conducting the overflow or discharge from said second vessel to the main stream of liquid.

7. In apparatus for chemically treating a flowing volume of liquid and in combination, a box, a horizontal weir in said box and over which liquid is adapted to flow, a trough located beneath said weir, a tray slidable over said trough, a drum or cylinder having a thread or groove on its periphery said thread having a progressively increasing pitch, a part attached to said tray and engaging said thread, means for rotating said drum whereby the tray is slid to uncover the trough at a progressively increasing rate of speed, and means for determining the amount of travel that has been imparted to the movable tray at any given time.

In witness whereof we have hereunto set our hands in the presence of two subscribing witnesses.

BERTRAND CHASE HINMAN.
ERNEST WILLIAM ROBEY.

Witnesses:
  B. HENDERSON,
  H. COTTAM.